(12) United States Patent
Feng

(10) Patent No.: US 10,813,117 B2
(45) Date of Patent: Oct. 20, 2020

(54) METHOD FOR WIRELESS COMMUNICATION, NETWORK DEVICE AND TERMINAL DEVICE

(71) Applicant: GUANGDONG OPPO MOBILE TELECOMMUNICATIONS CORP., LTD., Dongguan, Guangdong (CN)

(72) Inventor: Bin Feng, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 105 days.

(21) Appl. No.: 15/757,838

(22) PCT Filed: Nov. 25, 2015

(86) PCT No.: PCT/CN2015/095528
§ 371 (c)(1),
(2) Date: Mar. 6, 2018

(87) PCT Pub. No.: WO2017/088123
PCT Pub. Date: Jun. 1, 2017

(65) Prior Publication Data
US 2018/0343666 A1    Nov. 29, 2018

(51) Int. Cl.
*H04W 28/18* (2009.01)
*H04W 72/12* (2009.01)
(Continued)

(52) U.S. Cl.
CPC ....... *H04W 72/1284* (2013.01); *H04W 28/18* (2013.01); *H04W 72/14* (2013.01); *H04W 76/27* (2018.02); *H04W 84/042* (2013.01)

(58) Field of Classification Search
None
See application file for complete search history.

(56) References Cited

U.S. PATENT DOCUMENTS 9,220,113 B2 * 12/2015 Ishii ................. H04W 72/1278
2010/0077100 A1 * 3/2010 Hsu .................. H04W 72/1221
709/234

(Continued)

FOREIGN PATENT DOCUMENTS

CN 101330444 A 12/2008
CN 101674151 A 3/2010
(Continued)

OTHER PUBLICATIONS

International Search Report in international application No. PCT/CN2015/095528, dated Jun. 30, 2016.
(Continued)

*Primary Examiner* — Kodzovi Acolatse
(74) *Attorney, Agent, or Firm* — Ladas & Parry, LLP

(57) ABSTRACT

Disclosed is a method for wireless communication, a network device, and a terminal device. The method includes: sending, by a network device, configuration information to a terminal device, the configuration information instructing the terminal device to perform uplink data transmission according to a first transmission cycle; and determining, by the network device, a second transmission cycle for subsequent uplink data transmission of the terminal device according to data transmission of the terminal device on a transmission resource based on the first transmission cycle. In this way, allocation efficiency and utilization of uplink transmission resources can be improved, thereby avoiding waste of radio resources.

12 Claims, 6 Drawing Sheets

100

A network device sends configuration information to a terminal device, the configuration information instructing the terminal device to perform uplink data transmission according to a first transmission cycle — S110

The network device determines a second transmission cycle for subsequent uplink data transmission of the terminal device according to data transmission of the terminal device on a transmission resource corresponding to the first transmission cycle — S120

When the network device receives, on a transmission resource corresponding to the second transmission cycle, uplink data sent by the terminal device, the network device determines a numerical value less than the second transmission cycle as a third transmission cycle for further subsequent uplink data transmission of the terminal device — S130

(51) Int. Cl.
*H04W 76/27* (2018.01)
*H04W 72/14* (2009.01)
*H04W 84/04* (2009.01)

(56) References Cited

U.S. PATENT DOCUMENTS

| | | |
|---|---|---|
| 2010/0165927 A1 | 7/2010 | Kim |
| 2011/0053527 A1* | 3/2011 | Hunzinger ........... H04B 7/0404 455/101 |
| 2012/0182908 A1 | 7/2012 | Pan |
| 2012/0207040 A1* | 8/2012 | Comsa .............. H04W 72/1215 370/252 |
| 2012/0300686 A1* | 11/2012 | Maeda .............. H04W 52/0206 370/311 |
| 2012/0314680 A1 | 12/2012 | Kela |
| 2013/0294247 A1* | 11/2013 | Zhu ................... H04W 72/0486 370/235 |
| 2013/0343252 A1* | 12/2013 | Chakraborty ..... H04W 52/0261 370/311 |
| 2014/0023008 A1* | 1/2014 | Ahn ........................ H04L 5/006 370/329 |
| 2015/0282148 A1 | 10/2015 | Le |
| 2016/0050688 A1 | 2/2016 | Pan et al. |
| 2016/0270093 A1 | 9/2016 | Wang et al. |
| 2017/0070374 A1* | 3/2017 | Nakamura ............ H04L 1/0005 |
| 2017/0071010 A1* | 3/2017 | Lim .................. H04W 72/1284 |
| 2018/0352541 A1 | 12/2018 | Le |

FOREIGN PATENT DOCUMENTS

| | | |
|---|---|---|
| CN | 102014442 A | 4/2011 |
| CN | 102821477 A | 12/2012 |
| CN | 103916222 A | 7/2014 |
| GB | 2524594 A | 9/2015 |
| JP | 2010114681 A | 5/2010 |
| JP | 2010525688 A | 7/2010 |
| WO | 2007148932 A1 | 12/2007 |
| WO | 2011104417 A1 | 9/2011 |
| WO | 2015058382 A1 | 4/2015 |

OTHER PUBLICATIONS espacenet English abstract of CN 102821477.
espacenet English abstract of CN 101330444.
espacnet English abstract of CN 103916222.
espacenet English abstract of CN 102014442.
espacenet English abstract of CN 101674151.
Supplementary European Search Report in European application No. 15909035.6, dated Feb. 20, 2019.
English Translation of the Written Opinion of the International Search Authority in international application No. PCT/CN2015/095528, dated Jun. 30, 2016.
Research in Motion et al: "Detection Time of Uplink SPS Activation/Reconfiguration Signalling" 3GPP Draft; R2-086559, 3rd Generation Partnership Project (3GPP), Mobile Competence Centre ; 650, Route Des Lucioles ; F-06921 Sophia-Antipolis CDEDX ; France, No. Prague, Czech Republic; Nov. 4, 2008, Nov. 4, 2008 (Nov. 4, 2008), XP050321468,[retrieved on Nov. 4, 20084]*Proposal 1; p. 1, dated Oct. 29, 2008.

* cited by examiner

100

S110: A network device sends configuration information to a terminal device, the configuration information instructing the terminal device to perform uplink data transmission according to a first transmission cycle S120: The network device determines a second transmission cycle for subsequent uplink data transmission of the terminal device according to data transmission of the terminal device on a transmission resource corresponding to the first transmission cycle

S110: A network device sends configuration information to a terminal device, the configuration information instructing the terminal device to perform uplink data transmission according to a first transmission cycle S120: The network device determines a second transmission cycle for subsequent uplink data transmission of the terminal device according to data transmission of the terminal device on a transmission resource corresponding to the first transmission cycle S130: When the network device receives, on a transmission resource corresponding to the second transmission cycle, uplink data sent by the terminal device, the network device determines a numerical value less than the second transmission cycle as a third transmission cycle for further subsequent uplink data transmission of the terminal device

| A terminal device receives configuration information sent by a network device, the configuration information instructing the terminal device to perform uplink data transmission according to a first transmission cycle | ~ S210 |

| The terminal device determines a second transmission cycle for subsequent uplink data transmission according to a data transmission state on a transmission resource corresponding to the first transmission cycle | ~ S220 |

| A terminal device receives configuration information sent by a network device, the configuration information instructing the terminal device to perform uplink data transmission according to a first transmission cycle | ~ S210 |

| The terminal device determines a second transmission cycle for subsequent uplink data transmission according to data transmission on a transmission resource corresponding to the first transmission cycle | ~ S220 |

| When the terminal device sends, on a transmission resource corresponding to the second transmission cycle, uplink data to the network device, the terminal device determines a numerical value less than the second transmission cycle as a third transmission cycle for further subsequent uplink data transmission | ~ S230 |

FIG. 4

METHOD FOR WIRELESS COMMUNICATION, NETWORK DEVICE AND TERMINAL DEVICE

RELATED APPLICATION

This application is an application under 35 U.S.C. 371 of International Application No. PCT/CN2015/095528 filed on Nov. 25, 2015, the entire contents of which are incorporated herein by reference.

TECHNICAL FIELD

Embodiments of the present disclosure relate to communications, and more specifically, to a method for wireless communication, a network device, and a terminal device.

BACKGROUND

Currently, standardization organizations are discussing a latency reduction technology for wireless system based e.g. Long Term Evolution (LTE) system. Main optimization approaches include: (1) reduction in a transmission time interval (TTI) in a frame structure, for example, the TTI is reduced from 1 ms at present to 0.5 ms or even one orthogonal frequency division multiplexing (OFDM) symbol; (2) fast data transmission: a transmission time required upon arrival of uplink data is reduced for a user by means of resource pre-allocation that is similar to semi-persistent scheduling (SPS); and (3) handover delay optimization, that is, a delay in a handover process is optimized, where the focus lies in reducing a downlink synchronization time and an uplink synchronization time.

The optimization approach (2) mainly resolves a current problem of a data transmission delay upon arrival of data, especially, upon arrival of uplink data. According to an existing mechanism, when a terminal has no data to be transmitted, a base station does not allocate any uplink resource to the terminal. When it is necessary to transmit data, the terminal first sends an uplink scheduling request (SR) to the base station. Then, the base station assigns a fixed uplink scheduling grant (UL grant) to the terminal, to allow the terminal to report data required to be transmitted in a memory, that is, allow the terminal to send a buffer status report (BSR). The base station then allocates particular resources to the terminal according to the data required to be transmitted fed back in the BSR.

Currently, optimization for fast data transmission mainly includes two solutions: dedicated resource allocation based on an SPS mechanism and UL grant pre-assignment. However, efficiency and utilization of UL grant assignment are relatively low in the two solutions, thereby causing waste of radio resources.

SUMMARY

The present disclosure provides a method for wireless communication, a network device, and a terminal device, capable of improving allocation efficiency and utilization of uplink resources, and avoiding waste of radio resources.

According to a first aspect, a method for wireless communication is provided, including: sending, by a network device, configuration information to a terminal device, the configuration information indicating the terminal device to perform uplink data transmission with a first transmission cycle; and determining, by the network device, a second transmission cycle for subsequent uplink data transmission of the terminal device according to a data transmission of the terminal device on a transmission resource with the first transmission cycle.

According to a second aspect, a method for wireless communication is provided, including: receiving, by a terminal device, configuration information sent by a network device, the configuration information indicating the terminal device to perform uplink data transmission with a first transmission cycle; and determining, by the terminal device, a second transmission cycle for subsequent uplink data transmission according to a data transmission on a transmission resource with the first transmission cycle.

According to a third aspect, a method for wireless communication is provided, including: receiving, by a terminal device, configuration information sent by a network device, the configuration information indicating the terminal device to perform uplink data transmission on a first transmission resource; and sending, by the terminal device, an uplink data packet to the network device on the first transmission resource, so that the network device configures a second transmission resource for the terminal device according to the MAC layer information included in the uplink data packet.

According to a fourth aspect, a network device is provided, including: a transceiver module, configured to send configuration information to a terminal device, the configuration information indicating the terminal device to perform uplink data transmission with a first transmission cycle; and a processing module, configured to determine a second transmission cycle for subsequent uplink data transmission of the terminal device according to a data transmission of the terminal device on a transmission resource with the first transmission cycle.

According to a fifth aspect, a terminal device is provided, including: a transceiver module, configured to receive configuration information sent by a network device, the configuration information indicating the terminal device to perform uplink data transmission with a first transmission cycle; and a processing module, configured to determine a second transmission cycle for subsequent uplink data transmission according to a data transmission on a transmission resource with the first transmission cycle.

According to a sixth aspect, a terminal device is provided, including: a receiving module, configured to receive configuration information sent by a network device, the configuration information indicating the terminal device to perform uplink data transmission on a first transmission resource; and a sending module, configured to send an uplink data packet to the network device on the first transmission resource, so that the network device configures a second transmission resource for the terminal device according to the MAC layer information included in the uplink data packet.

Based on the foregoing technical features, in the methods for wireless communication, the network device, and the terminal device provided in the embodiments of the present disclosure, the network device can determine, according to a transmission state of uplink data of the terminal device, a cycle for configuring an uplink transmission resource for the terminal device. In this way, allocation efficiency and utilization of uplink transmission resources can be improved, thereby avoiding waste of radio resources.

BRIEF DESCRIPTION OF THE DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings according to these accompanying drawings without creative efforts.

FIG. 1 is a schematic flowchart showing a method for wireless communication according to an embodiment of the present disclosure FIG. 2 is another schematic flowchart showing a method for wireless communication according to an embodiment of the present disclosure.

FIG. 3 is a schematic flowchart showing a method for wireless communication according to another embodiment of the present disclosure.

FIG. 4 is another schematic flowchart showing a method for wireless communication according to another embodiment of the present disclosure.

DETAILED DESCRIPTION

Figure 5:
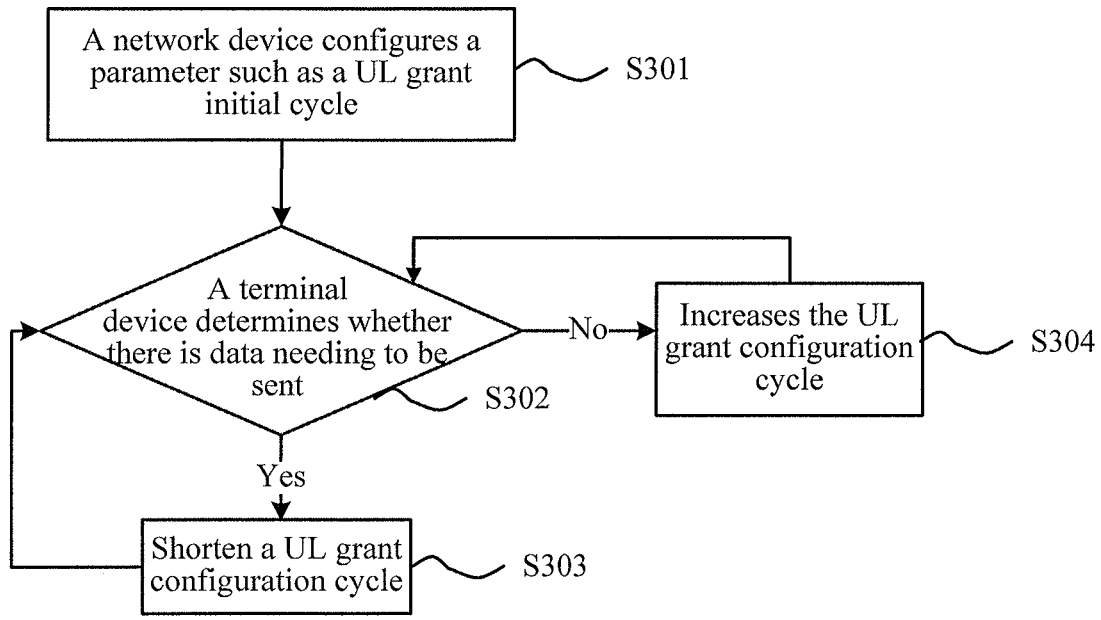
FIG. 5 is a schematic flowchart showing a method for wireless communication according to still another embodiment of the present disclosure.

The following clearly and completely describes technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the present disclosure may be applied to various communications systems, for example, the Global System of Mobile Communication (GSM) system, Code Division Multiple Access (CDMA) system, Wideband Code Division Multiple Access (WCDMA) system, Long Term Evolution (LTE) system, LTE Frequency Division Duplex (FDD) system, LTE Time Division Duplex (TDD), Universal Mobile Telecommunication System (UMTS), and future 5G communications system.

It should be understood that, in the embodiments of the present disclosure, a terminal device may also be referred to as user equipment, a mobile station (MS), a mobile terminal, and so on. The terminal device may communicate with one or more core networks through a radio access network (RAN). For example, the terminal device may be a mobile phone (or referred to as a cellular phone), or a computer having a mobile terminal. For example, the terminal device may be a portable, pocket, handheld, computer built-in or in-vehicle mobile apparatus, and a terminal device in the future 5G network or a terminal device in the future evolved Public Land Mobile Network (PLMN).

It should be further understood that, in the embodiments of the present disclosure, the network device may be a device configured to communicate with the terminal device. The network device may be a base transceiver station (BTS) in the GSM system or CDMA system, or may be a NodeB (NB) in the WCDMA system, or an Evolutional NodeB, eNB or eNodeB for short, in the LTE system. Alternatively, the network device may be a relay station, an access point, an in-vehicle device, a wearable device, and a network side device in the future 5G network, or a network device in the future evolved PLMN.

It should be noted that, terms such as "first" and "second" in the embodiments of the present disclosure are merely used to facilitate description but not constitute any limitation. For example, a first transmission cycle may be equal to a second transmission cycle, and the first transmission cycle may also be equal to a third transmission cycle.

FIG. 1 is a schematic flowchart showing a method for wireless communication according to an embodiment of the present disclosure. As shown in FIG. 1, the method 100 includes the following operations.

At S110, a network device sends configuration information to a terminal device, the configuration information indicating the terminal device to perform uplink data transmission with a first transmission cycle.

At S120, the network device determines a second transmission cycle for subsequent uplink data transmission of the terminal device according to a data transmission of the terminal device on a transmission resource with the first transmission cycle.

Therefore, in the method for wireless communication according to this embodiment of the present disclosure, the network device can determine a transmission cycle for subsequent uplink data transmission of the terminal device according to a transmission state of uplink data of the terminal device. In this way, allocation efficiency and utilization of uplink transmission resources can be improved, thereby avoiding waste of radio resources.

It should be noted that, in this embodiment of the present disclosure, the transmission resource may refer to a UL grant resource. The terminal device may send a BSR or packet data on the UL grant resource. The transmission cycle for uplink data transmission of the terminal device may be construed as a sending cycle or configuration cycle of the UL grant.

Optionally, in S110, the network device may send the configuration information to the terminal device by using broadcast signaling or dedicated signaling. After receiving the configuration information, if the terminal device has a data packet to be sent, the terminal device obtains a corresponding resource in a corresponding subframe according to the configuration information, and sends uplink data on the corresponding resource.

Optionally, in S120, when the network device receives, on the transmission resource with the first transmission cycle, uplink data sent by the terminal device, the network device determines the second transmission cycle according to a parameter to modify the cycle. The second transmission cycle is smaller than the first transmission cycle and is larger than or equal to a first preconfigured value.

That is, if the network device receives, on the transmission resource with the first transmission cycle, uplink data sent by the terminal device, the network device may shorten a cycle for configuring an uplink transmission resource for the terminal device. Specifically, the resource configuration cycle may be modified according to a parameter stipulated in a standard or a parameter agreed mutually in advance by the network device and the terminal device. For example, if a previous configuration cycle of a transmission resource is 40 ms and the network device receives, on this transmission resource, uplink data sent by the terminal device, the configuration cycle of the transmission resource may be reduced to 20 ms.

Optionally, a minimum value of the configuration cycle of the transmission resource may be defined according to a communications standard or may be configured by the network device. If a numerical value determined according to the parameter to modify the cycle is larger than the minimum value, the determined numerical value is determined as a new configuration cycle. However, if the numerical value determined according to the parameter to modify the cycle is smaller than or equal to the minimum value, the minimum value is determined as the new configuration cycle.

Optionally, in S120, when the network device does not receive, on the transmission resource with the first transmission cycle, uplink data sent by the terminal device, the network device determines the second transmission cycle according to a parameter to modify the cycle. The second transmission cycle is larger than the first transmission cycle and is smaller than or equal to a second preconfigured value.

That is, if the network device does not receive, on the transmission resource with the first transmission cycle, uplink data sent by the terminal device, the network device may increase a cycle for configuring an uplink transmission resource for the terminal device. Specifically, the resource configuration cycle may be modified according to a parameter to modify the cycle stipulated in a standard or a parameter to modify the cycle agreed mutually in advance by the network device and the terminal device. For example, if a previous configuration cycle of a transmission resource is 40 ms and the network device does not receive, on this transmission resource, uplink data sent by the terminal device, the configuration cycle of the transmission resource may be increased to 80 ms.

Optionally, a maximum value of the configuration cycle of the transmission resource may be defined according to a communications standard or may be configured by the network device. If a numerical value determined according to the parameter to modify the cycle is larger than or equal to the maximum value, the maximum value is determined as a new configuration cycle. However, if the numerical value determined according to the parameter to modify the cycle is smaller than the maximum value, the determined numerical value is determined as the new configuration cycle.

Further, as shown in FIG. 2, the method 100 further includes the following operation.

At S130, when the network device receives, on a transmission resource with the second transmission cycle, uplink data sent by the terminal device, the network device determines a numerical value smaller than the second transmission cycle as a third transmission cycle for further subsequent uplink data transmission of the terminal device.

That is, when the configuration cycle of the transmission resource increases, if the network device receives uplink data sent by the terminal device, the configuration cycle of the transmission resource may be reduced. Specifically, the network device may determine a numerical value smaller than the second transmission cycle according to the parameter to modify the cycle, and determine the numerical value smaller than the second transmission cycle as the third transmission cycle. Alternatively, the network device may reduce the configuration cycle of the transmission resource by directly restoring an initial value. For example, the first transmission cycle may be directly determined as the third transmission cycle.

In this embodiment of the present disclosure, optionally, the parameter to modify the cycle may include an algorithm and/or a step. In addition, the network device may send a radio resource control (RRC) message to the terminal device by broadcasting, multicasting, or unicasting. The RRC message includes the parameter to modify the cycle.

In an optional example, the algorithm to modify the cycle may include a random selection algorithm, an exponential algorithm, or a linear algorithm, and the algorithm may be identified by using particular bits. For example, two bits may be used to identify a type of the algorithm, where "00" identifies the random selection algorithm, "01" identifies the exponential algorithm, and "10" identifies the linear algorithm. The step may be identified by using a particular format. For example, 20 ms may be expressed as 20 fs or identified by using a system frame number (SFN)+subframe number (SubFrame).

In this embodiment of the present disclosure, optionally, after the terminal device finishes transmitting a data packet on the transmission resource configured by the network device, the terminal device may still have data that has not been sent. In this case, the terminal device may transmit corresponding information to the network device, so that the network device performs corresponding resource allocation.

Specifically, the network device receives, on the transmission resource with the first transmission cycle, an uplink data packet sent by the terminal device, where the uplink data packet carries first indication information in MAC layer, and the first indication information is used for indicating whether the terminal device has data to send.

Correspondingly, the network device determines, according to the first indication information, the second transmission cycle and a transmission resource with the second transmission cycle.

In an example, a MAC control element (MAC CE) part of the MAC layer carries the first indication information; or a MAC header part of the MAC layer carries the first indication information; or an information padding part of the MAC layer carries the first indication information.

For example, one bit may be used to carry the first indication information. When a numerical value of the bit is 1, it indicates that the terminal device still has a data packet required to be sent, and a resource needs to be reserved. In this case, the network device may configure a transmission resource for the terminal device by means of dynamic transmission resource configuration in the prior art or by means of fixed-cycle transmission resource configuration. When the numerical value of the bit is 0, it indicates that the terminal device has no data packet required to be sent, and it is unnecessary to reserve a resource. In this case, the network device may configure the transmission resource for the terminal device with the original configuration cycle or increase the configuration cycle of the transmission resource.

Optionally, the network device receives, on the transmission resource with the first transmission cycle, an uplink data packet sent by the terminal device, where the uplink data packet includes second indication information carried by a MAC layer, and the second indication information is used for indicating that the terminal device has data to send and a size of the data to send compared with uplink data sending on the transmission resource with the first transmission cycle.

Correspondingly, the network device determines, according to the second indication information, the second transmission cycle and a transmission resource with the second transmission cycle.

In an example, a MAC CE part of the MAC layer carries the second indication information; or a MAC header part of the MAC layer carries the second indication information; or an information padding part of the MAC layer carries the second indication information.

For example, one bit may be used to carry the second indication information. When a value of the bit is 1, it indicates that the terminal device has a data packet required to be sent and the size of the data packet required to be sent is larger than the size of the data packet sent previously. A resource block larger than a previously configured transmission resource block needs to be configured, so that transmission of this data packet can be completed. In this case, the network device may configure more transmission resources for the terminal device to send the data packet. For example, the quantity of resource blocks corresponding to the configured transmission resource may be twice the quantity of resource blocks corresponding to the previously configured transmission resource. When the value of the bit is 0, it indicates that the terminal device has a data packet required to be sent and the size of the data packet required to be sent is smaller than or equal to the size of the data packet sent previously. Sending of this data packet can be completed with a resource block the same as the previous resource block. In this case, the network device may configure, for the terminal device, a transmission resource having the same quantity of resource blocks as the previously configured transmission resource, for use in transmission of the data packet.

Therefore, in the method for wireless communication according to this embodiment of the present disclosure, the network device can determine a transmission cycle for subsequent uplink data transmission of the terminal device according to a transmission state of uplink data of the terminal device. In this way, allocation efficiency and utilization of uplink transmission resources can be improved, thereby avoiding waste of radio resources.

The method for wireless communication according to an embodiment of the present disclosure is described in detail from the perspective of the network device with reference to FIG. 1 and FIG. 2. Below, a method for wireless communication according to another embodiment of the present disclosure will be described in detail from the perspective of the terminal device with reference to FIG. 3 and FIG. 4. It should be understood that, interaction between the terminal device and network device as well as related features and functions thereof described from the perspective of the network device correspond to the description from the perspective of the terminal device. For the purpose of conciseness, repeated descriptions are omitted appropriately.

FIG. 3 is a schematic flowchart showing a method for wireless communication according to another embodiment of the present disclosure. As shown in FIG. 3, the method 200 includes the following operations.

At S210, a terminal device receives configuration information sent by a network device, the configuration information indicating the terminal device to perform uplink data transmission with a first transmission cycle.

At S220, the terminal device determines a second transmission cycle for subsequent uplink data transmission according to data transmission on a transmission resource corresponding to the first transmission cycle.

Therefore, in the method for wireless communication according to this embodiment of the present disclosure, the terminal device can determine a transmission cycle for subsequent uplink data transmission according to a transmission state of uplink data of the terminal device. In this way, utilization of uplink transmission resources can be improved, thereby avoiding waste of radio resources.

Optionally, the operation of S220 specifically includes that, when the terminal device sends, on the transmission resource corresponding to the first transmission cycle, uplink data to the network device, the terminal device determines the second transmission cycle according to a parameter to modify the cycle, where the second transmission cycle is smaller than the first transmission cycle and is larger than or equal to a first preconfigured value.

Optionally, the operation of S220 specifically includes that, when the terminal device does not send, on the transmission resource corresponding to the first transmission cycle, uplink data to the network device, the terminal device determines the second transmission cycle according to a parameter to modify the cycle, where the second transmission cycle is larger than the first transmission cycle and is smaller than or equal to a second preconfigured value.

Optionally, as shown in FIG. 4, the method 200 further includes the following operation.

At S230, when the terminal device sends, on a transmission resource corresponding to the second transmission cycle, uplink data to the network device, the terminal device determines a numerical value smaller than the second transmission cycle as a third transmission cycle for further subsequent uplink data transmission.

Optionally, the operation of S230 specifically includes that, the numerical value smaller than the second transmission cycle is determined according to the adjustment parameter, and the numerical value smaller than the second transmission cycle is determined as the third transmission cycle; or the first transmission cycle is determined as the third transmission cycle.

In this embodiment of the present disclosure, optionally, the terminal device receives an RRC message that is sent by the network device by means of broadcasting, multicasting, or unicasting, where the RRC message comprises the adjustment parameter.

In this embodiment of the present disclosure, optionally, the adjustment parameter includes an adjustment algorithm and/or an adjustment step.

In this embodiment of the present disclosure, optionally, the adjustment algorithm includes a random selection algorithm, an exponential algorithm, or a linear algorithm.

FIG. 5 shows a method for wireless communication according to still another embodiment of the present disclosure. As shown in FIG. 5, the method 300 includes the following operations.

At S301, a network device configures a parameter such as a UL grant initial cycle.

The network device may configure a parameter such as an initial cycle for the terminal device by using broadcast signaling or dedicated signaling.

At S302, a terminal device determines whether there is data required to be sent.

At S303, when the terminal device has data required to be sent, the terminal device determines that the network device shortens a UL grant configuration cycle.

The network device may shorten the UL grant configuration cycle (or referred to as a sending cycle) according to related steps described in the foregoing. To avoid repetition, details are not described herein again.

At S304, when the terminal device determines that there is no data required to be sent, the terminal device determines that the network device increases the UL grant configuration cycle.

The network device may increase the UL grant configuration cycle according to related steps described in the foregoing. To avoid repetition, details are not described herein again.

It should be understood that, after the network device configures a UL grant resource for the terminal device with a new UL grant configuration cycle, the terminal device is required to determine again whether there is data to be transmitted on the newly configured resource. If there is data to be transmitted, the operation S303 is performed. If there is no data to be transmitted, the operation S304 is performed.

Therefore, in the method for wireless communication according to this embodiment of the present disclosure, the terminal device can determine a transmission cycle for subsequent uplink data transmission according to a transmission state of uplink data of the terminal device. In this way, utilization of uplink transmission resources can be improved, thereby avoiding waste of radio resources.

Below, a method for wireless communication according to still another embodiment of the present disclosure will be described in detail from the perspective of the terminal device with reference to FIG. 6. It should be understood that, interaction between the terminal device and network device as well as related features and functions thereof described from the perspective of the network device correspond to the description from the perspective of the terminal device. For the purpose of conciseness, repeated descriptions are omitted appropriately.

Figure 6:
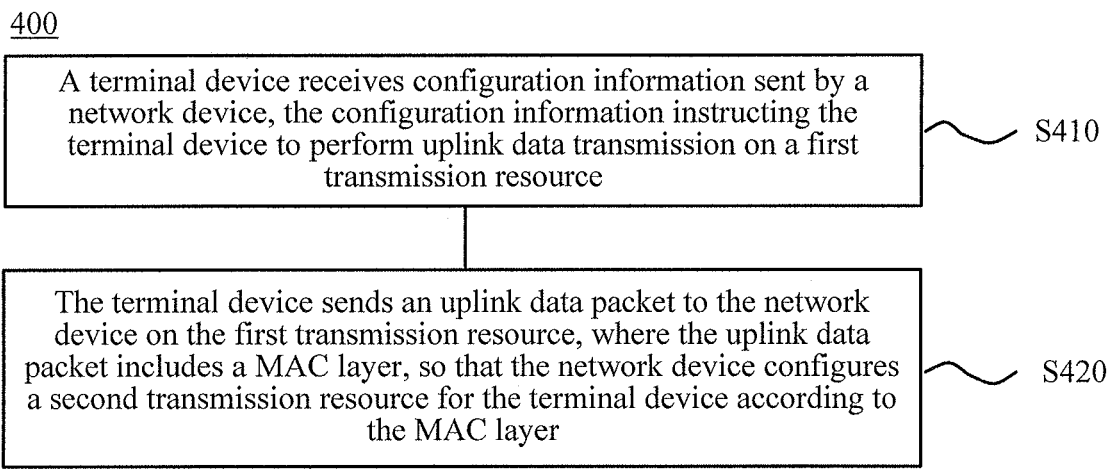
FIG. 6 is a schematic flowchart showing a method for wireless communication according to yet still another embodiment of the present disclosure.

FIG. 6 is a schematic flowchart showing a method for wireless communication according to still another embodiment of the present disclosure. As shown in FIG. 6, the method 400 includes the following operations.

At S410, a terminal device receives configuration information sent by a network device, the configuration information indicating the terminal device to perform uplink data transmission on a first transmission resource.

At S420, the terminal device sends an uplink data packet to the network device on the first transmission resource. The uplink data packet includes a MAC layer, so that the network device configures a second transmission resource for the terminal device according to the MAC layer information.

Therefore, in the method for wireless communication according to this embodiment of the present disclosure, the terminal device sends an uplink data packet including a MAC layer to the network device, and the network device can configure a transmission resource for the terminal device according to information carried in the MAC layer. In this way, utilization of transmission resources can be improved, thereby avoiding waste of radio resources.

Optionally, in S420, the MAC layer carries first indication information, and the first indication information is used for indicating whether the terminal device has data to send.

Optionally, in S420, the MAC layer carries second indication information, and the second indication information is used for indicating that the terminal device has data to send and a size of the data to send compared with uplink data sending on the first transmission resource.

In this embodiment of the present disclosure, optionally, a MAC CE part of the MAC layer carries the first indication information; or a MAC header part of the MAC layer carries the first indication information; or an information padding part of the MAC layer carries the first indication information.

In this embodiment of the present disclosure, optionally, a MAC CE part of the MAC layer carries the second indication information; or a MAC header part of the MAC layer carries the second indication information; or an information padding part of the MAC layer carries the second indication information.

Therefore, in the method for wireless communication according to this embodiment of the present disclosure, the terminal device sends an uplink data packet including a MAC layer to the network device, and the network device can configure a transmission resource for the terminal device according to information carried in the MAC layer. In this way, utilization of transmission resources can be improved, thereby avoiding waste of radio resources.

Figure 7:
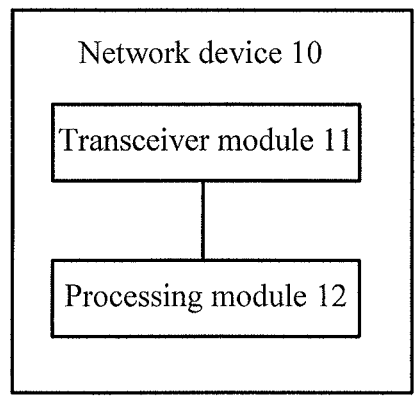
FIG. 7 is a schematic block diagram illustrating a network device according to an embodiment of the present disclosure.

FIG. 7 is a schematic block diagram illustrating a network device according to an embodiment of the present disclosure. As shown in FIG. 7, the network device 10 includes:

a transceiver module 11, configured to send configuration information to a terminal device, the configuration information indicating the terminal device to perform uplink data transmission with a first transmission cycle; and a processing module 12, configured to determine a second transmission cycle for subsequent uplink data transmission of the terminal device according to data transmission of the terminal device on a transmission resource corresponding to the first transmission cycle.

Therefore, the network device according to this embodiment of the present disclosure can determine a transmission cycle for subsequent uplink data transmission of the terminal device according to a transmission state of uplink data of the terminal device. In this way, allocation efficiency and utilization of uplink transmission resources can be improved, thereby avoiding waste of radio resources.

In this embodiment of the present disclosure, optionally, the processing module 12 is specifically configured to:

when the transceiver module 11 receives, on the transmission resource corresponding to the first transmission cycle, uplink data sent by the terminal device, determine the second transmission cycle according to a parameter to modify the cycle, where the second transmission cycle is smaller than the first transmission cycle and is larger than or equal to a first preconfigured value.

In this embodiment of the present disclosure, optionally, the processing module 12 is specifically configured to:

when the transceiver module 11 does not receive, on the transmission resource corresponding to the first transmission cycle, uplink data sent by the terminal device, determine the second transmission cycle according to a parameter to modify the cycle, where the second transmission cycle is larger than the first transmission cycle and is smaller than or equal to a second preconfigured value.

In this embodiment of the present disclosure, optionally, the processing module 12 is further configured to:

when the transceiver module 11 receives, on a transmission resource corresponding to the second transmission cycle, the uplink data sent by the terminal device, determine a numerical value smaller than the second transmission cycle as a third transmission cycle for further subsequent uplink data transmission of the terminal device.

In this embodiment of the present disclosure, optionally, the processing module 12 is specifically configured to:

determine the numerical value smaller than the second transmission cycle according to the adjustment parameter; and determine the numerical value smaller than the second transmission cycle as the third transmission cycle; or determine the first transmission cycle as the third transmission cycle.

In this embodiment of the present disclosure, optionally, the transceiver module 11 is further configured to receive, on the transmission resource with the first transmission cycle, an uplink data packet sent by the terminal device, where the uplink data packet includes first indication information in a MAC layer, and the first indication information is used for indicating whether the terminal device has data to send.

The processing module 12 is configured to determine, according to the first indication information, the second transmission cycle and a transmission resource with the second transmission cycle.

In this embodiment of the present disclosure, optionally, a MAC CE part of the MAC layer carries the first indication information; or a MAC header part of the MAC layer carries the first indication information; or an information padding part of the MAC layer carries the first indication information.

In this embodiment of the present disclosure, optionally, the transceiver module 11 is further configured to receive, on the transmission resource with the first transmission cycle, an uplink data packet sent by the terminal device, where the uplink data packet includes second indication information in a MAC layer, and the second indication information is used for indicating that the terminal device has data to send and a size of the data to send compared with uplink data sending on the transmission resource with the first transmission cycle.

The processing module 12 is configured to determine, according to the second indication information, the second transmission cycle and a transmission resource with the second transmission cycle.

In this embodiment of the present disclosure, optionally, a MAC CE part of the MAC layer carries the second indication information; or a MAC header part of the MAC layer carries the second indication information; or an information padding part of the MAC layer carries the second indication information.

In this embodiment of the present disclosure, optionally, the transceiver module 11 is further configured to send an RRC message to the terminal device by means of broadcasting, multicasting, or unicasting, where the RRC message includes the adjustment parameter.

In this embodiment of the present disclosure, optionally, the adjustment parameter includes an adjustment algorithm and/or an adjustment step.

In this embodiment of the present disclosure, optionally, the adjustment algorithm includes a random selection algorithm, an exponential algorithm, or a linear algorithm.

It should be understood that, the network device 10 according to this embodiment of the present disclosure may correspondingly execute the method 100 for wireless communication in the embodiment of the present disclosure, and the foregoing and other operations and/or functions of the modules in the network device 10 are respectively used for implementing corresponding processes of the methods shown in FIG. 1 and FIG. 2. For the purpose of conciseness, details are not described herein again.

Figure 8:
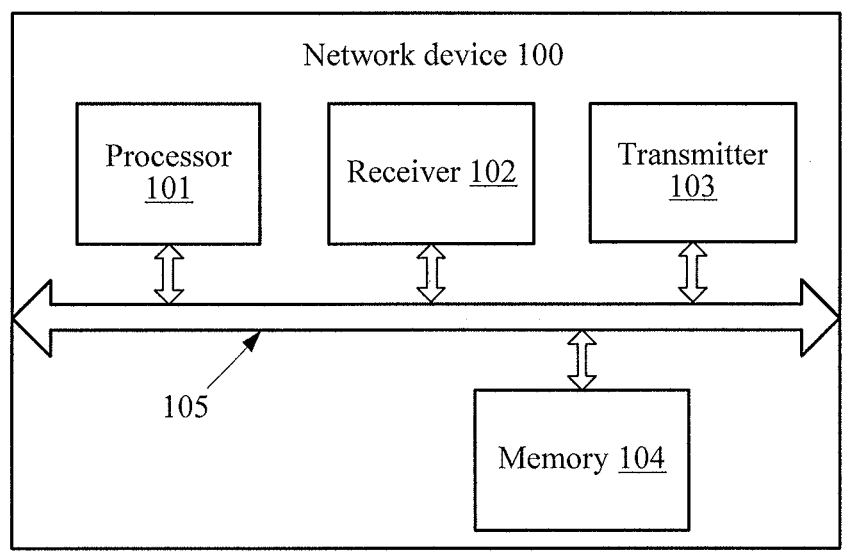
FIG. 8 is a schematic block diagram illustrating a network device according to another embodiment of the present disclosure.

It should be noted that, in this embodiment of the present disclosure, the transceiver module 11 may be implemented by a receiver and a transmitter. The processing module 12 may be implemented by a processor. As shown in FIG. 8, the network device 100 may include a processor 101, a receiver 102, a transmitter 103, and a memory 104. The memory 104 may be configured to store codes executed by the processor 101.

Components in the network device 100 may be coupled together by using a bus system 105. The bus system 105 further includes a power bus, a control bus, and a status signal bus in addition to a data bus.

It should be understood that, the network device 100 according to this embodiment of the present disclosure may correspond to the network device 10 in the embodiment of the present disclosure, and may correspond to a corresponding entity that executes the methods in the embodiment of the present disclosure. Moreover, the foregoing and other operations and/or functions of the modules in the network device 100 are respectively used for implementing corresponding processes of the methods in FIG. 1 and FIG. 2. For the purpose of conciseness, details are not described herein again.

Figure 9:
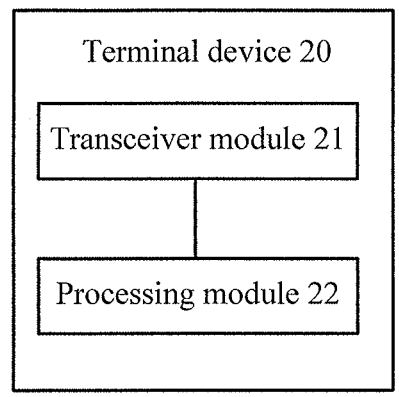
FIG. 9 is a schematic block diagram illustrating a terminal device according to an embodiment of the present disclosure.

FIG. 9 is a schematic block diagram illustrating a terminal device according to an embodiment of the present disclosure. As shown in FIG. 9, the terminal device 20 includes:

a transceiver module 21, configured to receive configuration information sent by a network device, the configuration information indicating the terminal device to perform uplink data transmission with a first transmission cycle; and a processing module 22, configured to determine a second transmission cycle for subsequent uplink data transmission according to data transmission on a transmission resource with the first transmission cycle.

Therefore, the terminal device according to this embodiment of the present disclosure can determine a transmission cycle for subsequent uplink data transmission according to a transmission state of uplink data of the terminal device. In this way, utilization of uplink transmission resources can be improved, thereby avoiding waste of radio resources.

In this embodiment of the present disclosure, optionally, the processing module 22 is specifically configured to, when the transceiver module 21 sends, on the transmission resource with the first transmission cycle, uplink data to the network device, determine the second transmission cycle according to a parameter to modify the cycle, where the second transmission cycle is smaller than the first transmission cycle and is larger than or equal to a first preconfigured value.

In this embodiment of the present disclosure, optionally, the processing module 22 is specifically configured to, when the transceiver module 21 does not send, on the transmission resource with the first transmission cycle, uplink data to the network device, determine the second transmission cycle according to a parameter to modify the cycle, where the second transmission cycle is larger than the first transmission cycle and is smaller than or equal to a second preconfigured value.

In this embodiment of the present disclosure, optionally, the processing module 22 is further configured to, when the transceiver module 21 sends, on a transmission resource with the second transmission cycle, the uplink data to the network device, determine a numerical value smaller than the second transmission cycle as a third transmission cycle for further subsequent uplink data transmission.

In this embodiment of the present disclosure, optionally, the processing module 22 is specifically configured to:

determine the numerical value smaller than the second transmission cycle according to the adjustment parameter; and determine the numerical value smaller than the second transmission cycle as the third transmission cycle; or determine the first transmission cycle as the third transmission cycle.

In this embodiment of the present disclosure, optionally, the transceiver module 21 is further configured to receive an RRC message that is sent by the network device by means of broadcasting, multicasting, or unicasting, where the RRC message includes the adjustment parameter.

In this embodiment of the present disclosure, optionally, the adjustment parameter includes an adjustment algorithm and/or an adjustment step.

In this embodiment of the present disclosure, optionally, the adjustment algorithm includes a random selection algorithm, an exponential algorithm, or a linear algorithm.

It should be understood that, the terminal device 20 according to this embodiment of the present disclosure may correspondingly execute the method 100 for wireless communication in the embodiment of the present disclosure, and the foregoing and other operations and/or functions of the modules in the terminal device 20 are respectively used for implementing corresponding processes of the methods shown in FIG. 3 and FIG. 4. For the purpose of conciseness, details are not described herein again.

Figure 10:
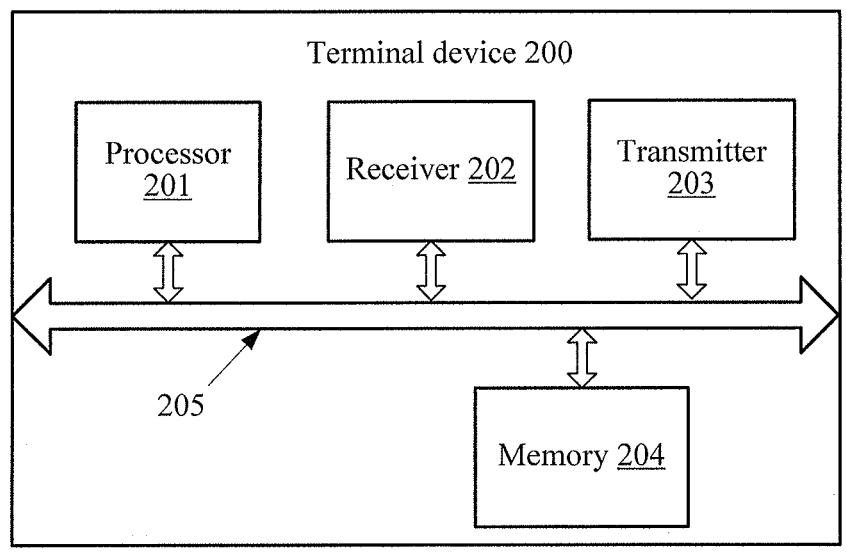
FIG. 10 is a schematic block diagram illustrating a terminal device according to another embodiment of the present disclosure.

It should be noted that, in this embodiment of the present disclosure, the transceiver module 21 may be implemented by a receiver and a transmitter. The processing module 22 may be implemented by a processor. As shown in FIG. 10, the terminal device 200 may include a processor 201, a receiver 202, a transmitter 203, and a memory 204. The memory 204 may be configured to store codes executed by the processor 201.

Components in the terminal device 200 may be coupled together by using a bus system 205. The bus system 205 further includes a power bus, a control bus, and a status signal bus in addition to a data bus.

It should be understood that, the terminal device 200 according to this embodiment of the present disclosure may correspond to the terminal device 20 in the embodiment of the present disclosure, and may correspond to a corresponding entity that executes the methods in the embodiment of the present disclosure. Moreover, the foregoing and other operations and/or functions of the modules in the terminal device 200 are respectively used for implementing corresponding processes of the methods shown in FIG. 3 and FIG. 4. For the purpose of conciseness, details are not described herein again.

Figure 11:
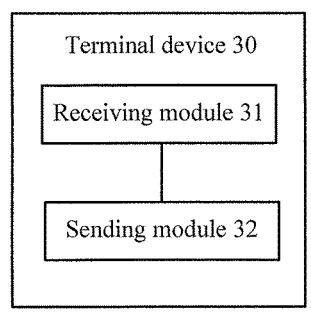
FIG. 11 is a schematic block diagram illustrating a terminal device according to still another embodiment of the present disclosure.

FIG. 11 is a schematic block diagram illustrating a terminal device according to another embodiment of the present disclosure. As shown in FIG. 11, the terminal device 30 includes:

a receiving module 31, configured to receive configuration information sent by a network device, the configuration information indicating the terminal device to perform uplink data transmission on a first transmission resource; and a sending module 32, configured to send an uplink data packet to the network device on the first transmission resource, so that the network device configures a second transmission resource for the terminal device according to the MAC layer information included in the uplink data packet.

Therefore, the terminal device according to this embodiment of the present disclosure sends an uplink data packet including a MAC layer to the network device, and the network device can configure a transmission resource for the terminal device according to information carried in the MAC layer. In this way, utilization of transmission resources can be improved, thereby avoiding waste of radio resources.

In this embodiment of the present disclosure, optionally, the MAC layer carries first indication information, and the first indication information is used for indicating whether the terminal device has data to send.

In this embodiment of the present disclosure, optionally, the MAC layer carries second indication information, and the second indication information is used for indicating that the terminal device has data to send and a size of the data to send compared with uplink data sending on the first transmission resource.

In this embodiment of the present disclosure, optionally, a MAC CE part of the MAC layer carries the first indication information; or a MAC header part of the MAC layer carries the first indication information; or an information padding part of the MAC layer carries the first indication information.

In this embodiment of the present disclosure, optionally, a MAC CE part of the MAC layer carries the second indication information; or a MAC header part of the MAC layer carries the second indication information; or an information padding part of the MAC layer carries the second indication information.

It should be understood that, the terminal device 30 according to this embodiment of the present disclosure may correspondingly execute the method 200 for wireless communication in the embodiment of the present disclosure, and the foregoing and other operations and/or functions of the modules in the terminal device 30 are respectively used for implementing corresponding processes of the method shown in FIG. 6. For the purpose of conciseness, details are not described herein again.

Figure 12:
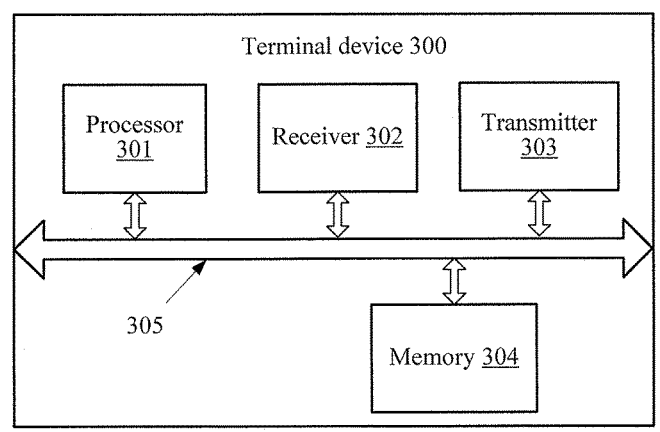
FIG. 12 is a schematic block diagram illustrating a terminal device according to still another embodiment of the present disclosure.

It should be noted that, in this embodiment of the present disclosure, the receiving module 31 and the sending module 32 may be implemented by a receiver and a transmitter. As shown in FIG. 12, the terminal device 300 may include a processor 301, a receiver 302, a transmitter 303, and a memory 304. The memory 304 may be configured to store codes executed by the processor 301. The processor 301 executes the codes stored in the memory 304, so as to control the receiver 302 to receive a signal and control the transmitter 303 to send a signal.

Components in the terminal device 300 are coupled together by using a bus system 305. The bus system 305 further includes a power bus, a control bus, and a status signal bus in addition to a data bus.

It should be understood that, the terminal device 300 according to this embodiment of the present disclosure may correspond to the terminal device 30 in the embodiment of the present disclosure, and may correspond to a corresponding entity that executes the methods in the embodiment of the present disclosure. Moreover, the foregoing and other operations and/or functions of the modules in the terminal device 300 are respectively used for implementing corresponding processes of the method in FIG. 6. For the purpose of conciseness, details are not described herein again.

A person of ordinary skill in the art may be aware that, units and algorithm steps in the examples described with reference to the embodiments disclosed in the specification may be implemented by electronic hardware, or a combination of computer software and electronic hardware.

Whether the functions are performed by hardware or software depends on the particular applications and design constraint conditions of the technical solution. A person skilled in the art may use different methods to implement the described functions for each particular application, but it should not be considered that such implementation goes beyond the scope of the present disclosure.

It may be clearly understood by a person skilled in the art that, for the purpose of convenient and brief description, for a detailed working process of the foregoing systems, apparatuses, and units, reference may be made to a corresponding process in the foregoing method embodiments, and details are not described herein again.

In the several embodiments provided in the present application, it should be understood that the disclosed systems, apparatuses, and methods may be implemented in other manners. For example, the described apparatus embodiments are merely examples. For example, the unit division is merely logical function division and there may be other division manners in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual needs to achieve the objective of the solution of this embodiment.

In addition, functional units in the embodiments of the present disclosure may be integrated into one processing unit, or each of the units may exist alone physically, or two or more units may be integrated into one unit.

When the functions are implemented in the form of software functional units and sold or used as an independent product, the functions may be stored in a computer-readable storage medium. Based on such an understanding, the technical solution of the present disclosure essentially, or the part contributing to the prior art, or a part of the technical solution may be implemented in the form of a software product. The computer software product is stored in a storage medium and includes several instructions for instructing a computer device (which may be a personal computer, a server, a network device, or the like) to perform all or some of the steps of the method described in each embodiment of the present disclosure. The foregoing storage medium includes any medium that can store program codes, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be in accordance with the claims.

The invention claimed is:

1. A method for wireless communication, comprising:
    sending, by a network device, configuration information to a terminal device, the configuration information indicating the terminal device to perform uplink data transmission with a first transmission cycle; and
    determining, by the network device, a second transmission cycle for subsequent uplink data transmission of the terminal device based on a predefined parameter to modify the cycle, according to whether uplink data sent by the terminal device is received on a transmission resource with the first transmission cycle, sent by the terminal device, received on the transmission resource with the first transmission cycle, wherein
    responsive to that the network device does not receive, on the transmission resource with the first transmission cycle, the uplink data sent by the terminal device, determining, by the network device, the second transmission cycle according to the predefined parameter to modify the cycle, wherein the second transmission cycle is larger than the first transmission cycle and is smaller than or equal to a second preconfigured value;
    responsive to that the network device receives, on a transmission resource with the second transmission cycle, the uplink data sent by the terminal device, determining, by the network device, a numerical value smaller than the second transmission cycle as a third transmission cycle for further subsequent uplink data transmission of the terminal device,
    wherein the operation of determining the numerical value smaller than the second transmission cycle as the third transmission cycle for further subsequent uplink data transmission of the terminal device comprises:
    determining the numerical value smaller than the second transmission cycle according to the predefined parameter to modify the cycle; and
    determining the numerical value smaller than the second transmission cycle as the third transmission cycle; or
    determining the first transmission cycle as the third transmission cycle.

2. The method according to claim 1, wherein the operation of determining, by the network device, the second transmission cycle for the subsequent uplink data transmission of the terminal device based on the predefined parameter to modify the cycle, according to whether the uplink data sent by the terminal device is received on the transmission resource with the first transmission cycle comprises:
    responsive to that the network device receives, on the transmission resource with the first transmission cycle, the uplink data sent by the terminal device, determining, by the network device, the second transmission cycle according to the predefined parameter to modify the cycle, wherein the second transmission cycle is smaller than the first transmission cycle and is larger than or equal to a first preconfigured value.

3. The method according to claim 2, further comprising:
    sending, by the network device, a radio resource control (RRC) message to the terminal device by broadcasting, multicasting, or unicasting, wherein the RRC message comprises the predefined parameter to modify the cycle,
    wherein the predefined parameter comprises: an algorithm and/or a step to modify the cycle.

4. The method according to claim 2, wherein the first preconfigured value and the second preconfigured value are defined according to a communications standard or being configured by the network device.

5. A method for wireless communication, comprising:
    receiving, by a terminal device, configuration information sent by a network device, the configuration information indicating the terminal device to perform uplink data transmission with a first transmission cycle; and determining, by the terminal device, a second transmission cycle for subsequent uplink data transmission based on a predefined parameter to modify the cycle, according to whether uplink data is sent to the network device on a transmission resource with the first transmission cycle, wherein responsive to that the terminal device does not send, on the transmission resource with the first transmission cycle, the uplink data to the network device, determining, by the terminal device, the second transmission cycle according to the predefined parameter to modify the cycle, wherein the second transmission cycle is larger than the first transmission cycle and is smaller than or equal to a second preconfigured value; and responsive to that the terminal device sends, on a transmission resource with the second transmission cycle, the uplink data to the network device, determining, by the terminal device, a numerical value smaller than the second transmission cycle as a third transmission cycle for further subsequent uplink data transmission, wherein the operation of determining the numerical value smaller than the second transmission cycle as the third transmission cycle for further subsequent uplink data transmission comprises:

determining the numerical value smaller than the second transmission cycle according to the predefined parameter to modify the cycle; and determining the numerical value smaller than the second transmission cycle as the third transmission cycle; or determining the first transmission cycle as the third transmission cycle.

6. The method according to claim 5, wherein the operation of determining, by the terminal device, the second transmission cycle for the subsequent uplink data transmission based on a predefined parameter to modify the cycle, according to whether the uplink data is sent to the network device on the transmission resource with the first transmission cycle comprises:

responsive to that the terminal device sends, on the transmission resource with the first transmission cycle, the uplink data to the network device, determining, by the terminal device, the second transmission cycle according to the predefined parameter to modify the cycle, wherein the second transmission cycle is smaller than the first transmission cycle and is larger than or equal to a first preconfigured value.

7. The method according to claim 6, further comprising:

receiving, by the terminal device, a radio resource control (RRC) message that is sent by the network device by broadcasting, multicasting, or unicasting, wherein the RRC message comprises the predefined parameter to modify the cycle, wherein the predefined parameter comprises: an algorithm and/or a step to modify the cycle.

8. The method according to claim 6, wherein the first preconfigured value and the second preconfigured value are defined according to a communications standard or being configured by the network device.

9. A terminal device, comprising:

a transceiver, configured to receive configuration information sent by a network device, the configuration information indicating the terminal device to perform uplink data transmission with a first transmission cycle; and a processor, configured to determine a second transmission cycle for subsequent uplink data transmission based on a predefined parameter to modify the cycle, according to whether uplink data is sent to the network device on a transmission resource with the first transmission cycle, wherein the processor is specifically configured to:

responsive to that the transceiver does not send, on the transmission resource with the first transmission cycle, the uplink data to the network device, determine the second transmission cycle according to the predefined parameter to modify the cycle, wherein the second transmission cycle is larger than the first transmission cycle and is smaller than or equal to a second preconfigured value;

wherein the processor is further configured to:

responsive to that the transceiver sends, on a transmission resource with the second transmission cycle, uplink data to the network device, determine a numerical value smaller than the second transmission cycle as a third transmission cycle for further subsequent uplink data transmission, wherein the processor is specifically configured to:

determine the numerical value smaller than the second transmission cycle according to the predefined parameter to modify the cycle; and determine the numerical value smaller than the second transmission cycle as the third transmission cycle; or determine the first transmission cycle as the third transmission cycle.

10. The terminal device according to claim 9, wherein the processor is specifically configured to:

responsive to that the transceiver sends, on the transmission resource with the first transmission cycle, the uplink data to the network device, determine the second transmission cycle according to the predefined parameter to modify the cycle, wherein the second transmission cycle is smaller than the first transmission cycle and is larger than or equal to a first preconfigured value.

11. The terminal device according to claim 10, wherein the transceiver is further configured to:

receive a radio resource control (RRC) message that is sent by the network device by broadcasting, multicasting, or unicasting, wherein the RRC message comprises the predefined parameter to modify the cycle, wherein the predefined parameter comprises: an algorithm and/or a step to modify the cycle.

12. The method according to claim 10, wherein the first preconfigured value and the second preconfigured value are defined according to a communications standard or being configured by the network device.

* * * * *